(No Model.)
M. CHASE.
TIRE TIGHTENER.
No. 379,561. Patented Mar. 20, 1888.
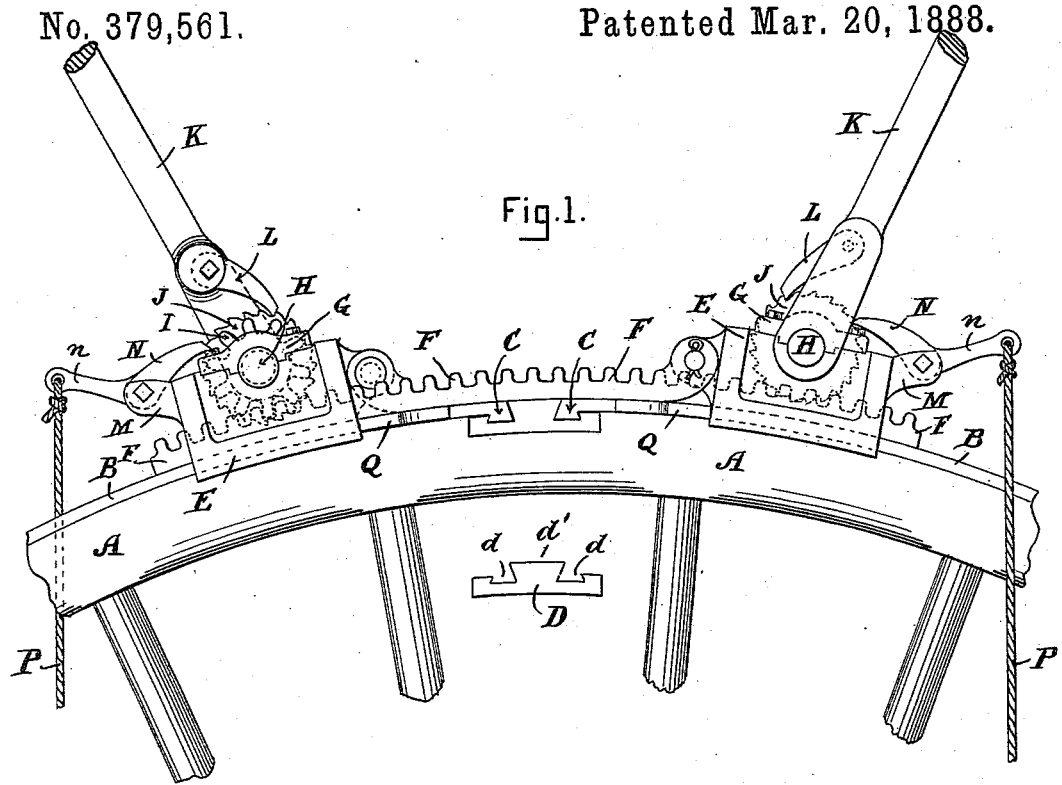
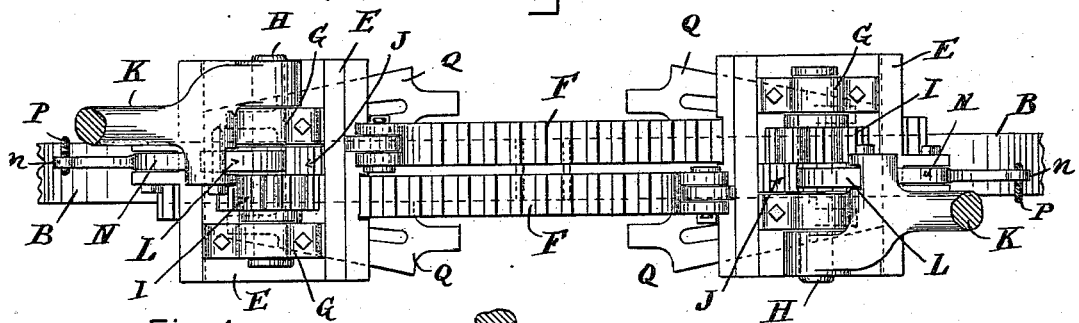
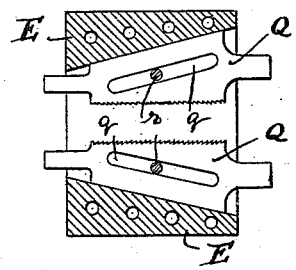
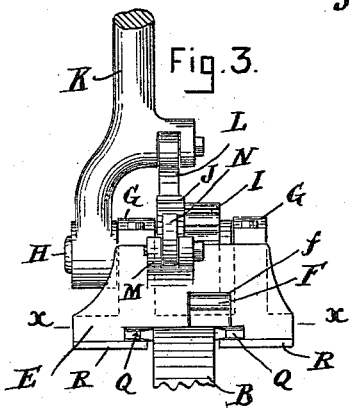
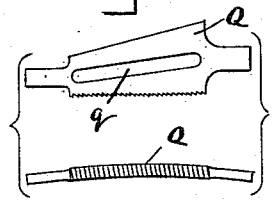
Witnesses.
J. George Setton
A. R. Beddall
Inventor.
Milton Chase
by E. Planta
Attorney

UNITED STATES PATENT OFFICE.

MILTON CHASE, OF HAVERHILL, MASSACHUSETTS.

TIRE-TIGHTENER.

SPECIFICATION forming part of Letters Patent No. 379,561, dated March 20, 1888.

Application filed July 7, 1887. Serial No. 243,629. (No model.)

*To all whom it may concern:*

Be it known that I, MILTON CHASE, a citizen of the United States, residing at Haverhill, in the county of Essex and State of Massachusetts, have invented a new and useful Improvement in Tire-Tighteners, of which the following is a specification.

My invention relates to tire-tighteners for that class of tires that are of a length slightly less than the circumference of the wheel and the ends of which are disconnected and each provided with a dovetail projection, the two ends of the tire being held in position on the wheel by means of a key or plate formed to correspond with and fill up the space between the ends of the tire.

The invention consists of two frames, to each of which is hinged a rack, the rack connected to one frame being operated by a pinion mounted in the other frame, a rotary motion being given to the pinion by means of a hand-lever, pawl, and ratchet-wheel. In each of the frames are mounted two clamping-jaws, so that as the levers are operated to draw the frames toward each other the clamping-jaws will grip the edges of the tire and draw it tightly onto the fellies.

Referring to the accompanying drawings, Figure 1 represents a side view of a tire-tightener embodying my invention as applied to a wheel and tire. Fig. 2 is a plan or top view of the same. Fig. 3 is an end view. Fig. 4 is a horizontal section taken on line $xx$ of Fig. 3, showing the clamping-jaws. Fig. 5 represents a plan and edge view of one of the clamping-jaws.

A represents the fellies of a wheel, around which is placed the tire B. The tire is of a length somewhat shorter than the circumference of the wheel, and has at each end, on its under side, a dovetailed projection, C, which fits in corresponding dovetailed recesses, $d\ d$, in a key or plate, D. (Shown detached in Fig. 4.) The central portion, $d'$, of the key D is made to be flush with the circumference of the tire.

E E are frames, to each of which is hinged or pivoted a rack, F, the free end of which passes through an aperture, $f$, in the opposite frame E. On each of the frames E, in suitable bearings, G G, is mounted a shaft, H, and formed in one with or secured upon this shaft is a pinion, I, that gears with the rack F and a ratchet-wheel, J, and upon the end of the shaft H is loosely mounted a lever, K, that carries a pawl, L, which operates the ratchet-wheel J. The rear of the frames E are formed with ears M, to which is pivoted a pawl, N, for retaining the ratchet-wheel J while the lever K is being drawn back. The pawls N, I prefer to form with a tail, $n$, as shown in Figs. 1 and 2, to which a cord, P, can be attached, by means of which the operator can release the pawls with his feet, if desired.

Q Q are clamping-jaws free to slide in recesses formed in the lower part of the frame E, and are held in place by means of plates R R, screwed or otherwise fastened to the bottom of the frames E. Each of the jaws Q are provided with a slot, $q$, through which a pin or stud, $r$, passes, to keep the jaws from falling out of the frames E, and yet be free to be adjusted to tires of various widths. Each of the faces of the jaws that comes into contact with the tire is provided with teeth cut on an incline, so that when they are being drawn forward they will grip the edge of the tire and will not be liable to rise at the rear end, as would be the case if the teeth were cut perpendicularly.

The operation is as follows: The tire B having been placed around the fellies of the wheel, the tire-tightener is then placed upon the tire so that the ends of the tire will be in about the center of the tightener. The clamping-jaws Q are then pushed so that their faces or teeth come into contact with the edges of the tire B. A reciprocating motion is then imparted to the levers K K by the hands of the operator, which, by means of pawls L, impart a rotary movement to the ratchet-wheels J, and consequently to the pinions I, that operate upon the racks F F and draw the two frames E E toward each other, and by reason of the inclined edge of the jaws Q working against the inclined plane in the frame the jaws are caused to firmly grip the tire and draw it tightly and evenly around the fellies, when a key, D, of the proper size is driven in between the ends of the tire, thereby securely holding the tire in position. To remove the tightener from the wheel, the pawl N is raised, either by hand or by the foot of the operator by means of the cords P, and the pawls L are lifted up. The frames E are then drawn back, when the tightener will become loose and can then be lifted off.

Among the advantages of my invention are the following: A great saving of time and expense is effected in applying and resetting the tire. A perfect fitting of the tire is also effected, and consequently all rattling is avoided and the fellies are completely protected.

What I claim as my invention is—

1. A tire-tightener consisting of two frames connected together by racks, in combination with pinions and levers for operating the same, and clamping-jaws, substantially as set forth.

2. In a tire-tightener, the clamping-jaws Q Q Q Q, in combination with the frames E E and racks F F and suitable mechanism for drawing the frames toward each other, substantially as set forth.

3. In a tire-tightener, the combination of the frames E E, racks F F, pinions I I, ratchet-wheels J J, levers K K, pawls L L, and jaws for clamping the sides of the tire, substantially as shown and described.

4. In a tire-tightener, the pawl N, provided with tail $n$ and rope P, in combination with the frame E and ratchet-wheel J, substantially as and for the purpose set forth.

In testimony whereof I have signed my name to this specification in the presence of two subscribing witnesses.

MILTON CHASE.

Witnesses:
HENRY W. FOLSOM,
E. PLANTA.